United States Patent [19]

Jochem et al.

[11] Patent Number: 4,765,271
[45] Date of Patent: Aug. 23, 1988

[54] METHOD OF ARRANGEMENT FOR COATING A FIBRE

[75] Inventors: Cornelius M. G. Jochem; Jacobus W. C. Van Der Ligt, both of Eindhoven, Netherlands

[73] Assignee: U.S. Philips Corporation, New York, N.Y.

[21] Appl. No.: 69,746

[22] Filed: Jul. 2, 1987

Related U.S. Application Data

[60] Division of Ser. No. 853,295, Apr. 17, 1986, Pat. No. 4,704,307, which is a continuation-in-part of Ser. No. 780,511, Sep. 26, 1985, abandoned.

[30] Foreign Application Priority Data

Apr. 19, 1985 [NL] Netherlands ............... 8501145

[51] Int. Cl.⁴ .................................................. B05D 1/18
[52] U.S. Cl. ....................................... 118/405; 118/420; 118/429
[58] Field of Search ................. 118/405, 420, 429; 427/434.7

[56] References Cited

U.S. PATENT DOCUMENTS

| | | | |
|---|---|---|---|
| 4,349,587 | 9/1982 | Aloisio | 427/434.7 |
| 4,374,161 | 2/1983 | Geyling | 427/434.7 |
| 4,439,467 | 3/1984 | Kassahun | 427/434.7 |
| 4,490,415 | 12/1984 | Imamura | 427/434.7 |
| 4,533,570 | 8/1985 | Iyengar | 427/434.7 |
| 4,539,226 | 9/1985 | Paek | 118/405 |

Primary Examiner—Richard Bueker
Attorney, Agent, or Firm—Norman N. Spain

[57] ABSTRACT

A method of and an apparatus for providing a bubble-free coating on a fibre, more particularly on an optical fibre. A fibre to be coated is fed into a pressure chamber (61) via an inlet duct (56) with a restricted inlet opening (57) and leaves the pressure chamber (61) through an outlet opening (41) of a nozzle (40). Liquid coating material is supplied to the pressure chamber (61) at such a pressure that the coating material rises in the inlet duct (56) up to a certain level to form a convex meniscus (D). By flushing the surroundings of the inlet opening (57) with a gas having a kinematic viscosity which is lower than that of air, the drawing speed at which the applied coating is still bubble-free can be considerably increased.

5 Claims, 3 Drawing Sheets

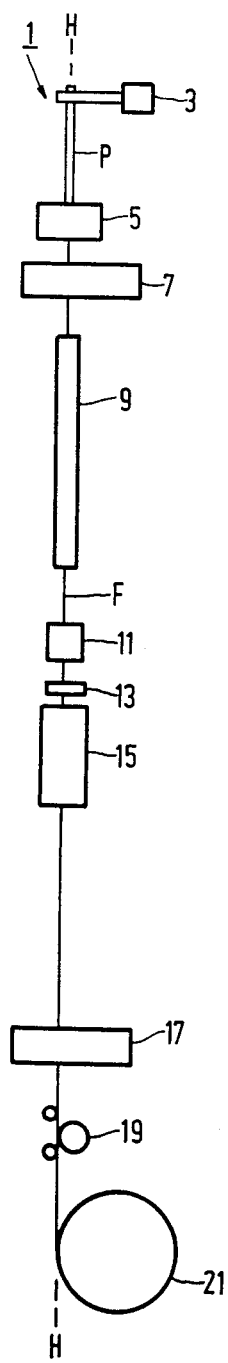
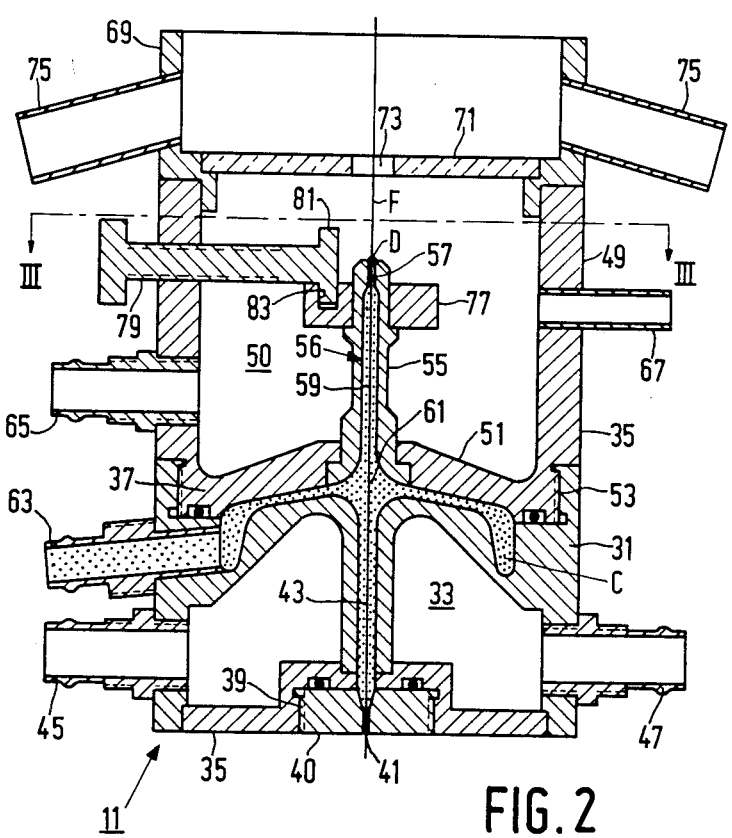
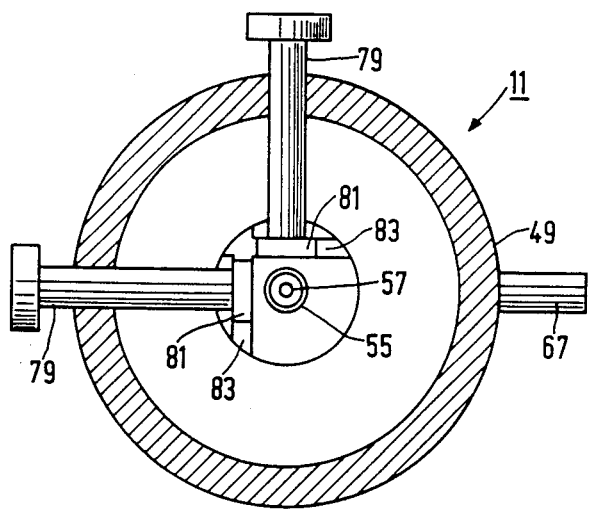
FIG. 1
FIG. 2
FIG. 3

METHOD OF ARRANGEMENT FOR COATING A FIBRE

This is a division of application Ser. No. 853,295, filed 4/17/86, now U.S. Pat. No. 4,704,307, which is a continuation-in-part of application Ser. No. 780,511, filed 9/26/85, now abandoned.

RELATED APPLICATIONS

The invention relates to a method of coating a fibre, in which a fibre to be coated is passed through an inlet duct with a restricted inlet opening, is guided through a pressure chamber filled with liquid coating material, is drawn through the outlet opening of a nozzle, the coating material being supplied under pressure to the pressure chamber.

The invention also relates to an arrangement for carrying out the method.

Fibres are frequently provided with a coating for protection against mechanical damage, for insulation, for coding purposes and for other applications. Thus, for example, glass fibres, which are used for optical communication, should be covered with a protective coating immediately after the manufacture after having been drawn out of a crucible or from a preform. Since glass is a brittle material, the strength and the mechanical reliability of the fibre in the long run strongly depends upon the quality of the surface of the fibre. Scratches, haircracks and dust particles on the surface of the fibre are not allowed. In order to obtain a fibre with a flawless surface, the temperature and gas conditions in the drawing furnace or crucible have to be carefully chosen. In order to maintain this perfect surface of the fibre once obtained the fibre has to be coated with a protective layer. This has to take place in a continuous process before the fibre gets into contact in some manner or other with some object. Dust-free conditions before the fibre is coated are of major importance. The coating material, mostly a polymeric synthetic material, is applied in the liquid state and is subsequently cured thermally or by means of ultraviolet light. The coating may consist of a single layer of synthetic material or of two protective layers; in the case of a double-layer coating, two layers of synthetic material may be applied or a first layer of a comparatively soft material, such as silicone rubber or a hot-melt wax, and a second layer of synthetic material may be applied. It is usual to apply to a frequently used standard glass fibre having a diameter of 125 $\mu$m a coating having a thickness varying from 25 to 60 $\mu$m.

In principle, a glass fibre is provided with a coating by passing the fibre through a container filled with liquid coating material and by then drawing it through the outlet opening of a nozzle. With an increasing drawing speed there is a risk of slip, that is to say that the fibre leaves the outlet opening without a coating layer. Slip or sliding occurs when the shearing forces on the interface, i.e. the contact surface between coating material and fibre, exceed a critical value.

It has further proved very difficult in practice to apply the coating in a bubble-free manner, especially at high drawing speeds. Already at high drawing speeds of approximately 1,6 m/s, the concentration of bubbles is already impermissible high. The bubbles are formed in that, for example with the use of the open-cup applicator, the fibre draws a deep funnel or cone when it enters the liquid coating material which is present in an open cup. A relatively large quantity of air is taken along by the fibre moving at a high speed into the coating material. By circulation and by vibrations and the like, air occlusions are formed in the coating material. A part of the air occlusions is enclosed in the coating in the form of bubbles. The term "drawing speed" is to be understood to mean the speed at which the fibre is drawn and is passed through the cup. The major part of the air occlusions is collected on the surface of the coating material and forms a dense foam layer.

Bubbles in the coating of optical fibres are very undesirable: a first disadvantageous effect is that the fibre is located eccentrically in the outlet opening of the nozzle and does not follow the centre line of the outlet opening; that further the fibre is not located coaxially in the coating; that air bubbles can also cause variations of the diameter and the thickness of the coating; and that larger air bubbles can extend substantially throughout the thickness of the coating so that the fibre is locally not coated. In general, air bubbles in the coating adversely affect the mechanical and optical properties of the fibre.

Another example of a fibre that has to be provided with a coating is copper winding wire. The winding wire used in practice generally has a diameter varying from 20 $\mu$m to 1250 $\mu$m. This wire has applied to it an electrically insulating coating consisting of a lacquer layer having a thickness which increases from 4 $\mu$m for a wire having a diameter of 20 $\mu$m to 60 $\mu$m for a wire having a diameter of 1250 $\mu$m. In view of the comparatively small thickness of the coating, a bubble-free coating is absolutely required for fibres of this kind.

A method of the kind described in the opening paragraph is known from U.S. Pat. No. 4,409,263. In this known method of coating optical fibres, air bubbles are first taken along by the fibre and are then returned to a container in which the air bubbles collect at the surface of the coating material in the container break up or are drained via an overflow. According to the said patent with this known method the number of bubbles in the coating can be drastically reduced with respect to the known open cup method and fibres can be provided with a substantially bubble-free coating. However, in the experiments described, only bubbles having a diameter of 25 $\mu$m or larger are taken into account. As to the drawing speeds, it is only stated that the usual value is 1 m/s.

SUMMARY OF THE INVENTION

The invention has for its object to provide a method in which dragging of air into the coating matwrial and the formation and occlusion of bubbles in the coating is strongly reduced or even completely prevented right from the beginning and with which it is possible to coat fibres with smaller concentrations of bubbles or even absolutely without bubbles, i.e. without bubbles microscopically observable in the case of an enlargement of 200, even at very high drawing speeds not yet used hitherto.

According to the invention, this object is mainly achieved in that the coating material is supplied at such a pressure and in such a quantity that the rises in the duct up to a certain level to form a convex meniscus.

By a suitable choice of the pressure and of the quantity of coating material supplied per unit time, a stationary situation without flow of and without turbulence in the coating material is obtained in the inlet duct. Dependent on the pressure and the rate at which the coating material is supplied to the pressure chamber the convex meniscus is formed in the inlet duct or in the inlet opening thereof at a stabilized level. It has been found that no funnel observable with the eye is drawn in the coating material by the fibre so that dragging of air and occlusion of air bubbles is prevented at all. Laborious and not easily controllable measures for removing air bubbles once taken along are therefore not required in the method according to the invention.

It should be noted that a method of coating fibres is known from U.S. Pat. No. 4,374,161 in which coating material is supplied to a passage duct at a comparatively high pressure and in which coating material accumulates on the inlet opening of the passage duct. However, during coating of a fibre, a funnel is drawn in the accumulated coating material by the moving fibre. According to this patent, foam that has formed by air bubbles occluded in the coating material emanates during operation.

BRIEF DESCRIPTION OF THE DRAWINGS

FIG. 1 is a diagrammatic view of equipment for drawing optical fibers;

FIG. 2 is a longitudinal sectional view of an arrangement of the invention for coating fibers;

FIG. 3 is a cross-sectional view of the arrangement in FIG. 2 taken on the III—III;

DETAILED DESCRIPTION OF THE INVENTION

Figure 4:
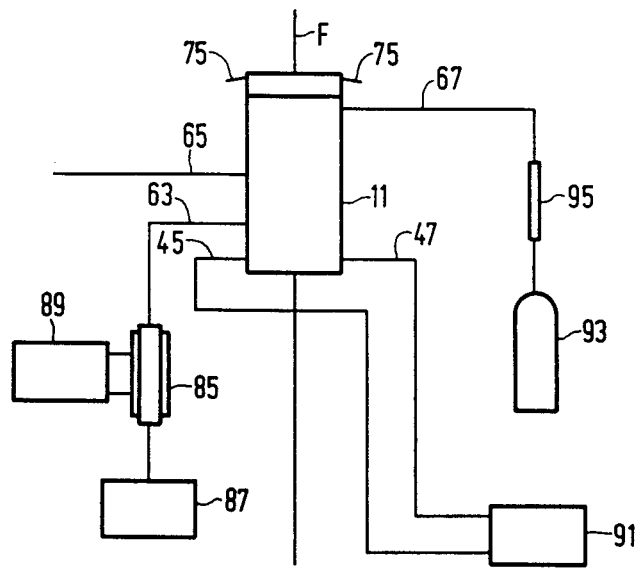
FIG. 4 is a diagrammatic view of an apparatus for supplying coating material and gas to the arrangement shown in FIG. 3 and for the recirculation of water in that arrangement.

In a preferred embodiment of the method according to the invention, the fibre is guided from the restricted inlet opening to the pressure chamber via a guide duct. Due to this measure, it is possible to build up a pressure gradient along the fibre from the restricted inlet opening in the direction of the pressure chamber, as a result of which the penetration of air bubbles is further impeded.

It should be noted that in the method according to the aforementioned U.S. Pat. No. 4,409,263, in contrast with the method according to the invention, the restricted inlet opening merges on the exit side directly into a pressure chamber and adjoins a supply duct on the entrance side; an essential abrupt build-up of pressure then takes place only in the restricted inlet opening; air bubbles are not prevented from entering the supply duct.

Another preferred embodiment of the method according to the invention is characterized in that the temperature of the coating material present in the pressure chamber is adjusted so that a coating layer of the desired thickness is obtained. The thickness of the coating layer is determined in the first instance by the dimensions of the outlet opening in the nozzle and is further influenced by the viscosity of the coating material present in the pressure chamber. In the case of deviations from the desired thickness of the coating layer, according to the invention, the temperature and hence the viscosity of the coating material in the pressure chamber are readjusted so that the desired thickness is maintained.

Experiments have shown that by means of the method according to the invention fibres can be provided with an absolutely bubble-free coating at drawing speeds of approximately 2,5 m/s an ordinary air atmosphere being maintained above the inlet opening. At speeds of from about 3 m/s, the process is no longer reproducible and bubbles can be formed again although this phenomenon is limited to bubbles having a diameter which at any rate is smaller than 25 $\mu$m, i.e. at most 15 $\mu$m, and the concentrations of which are smaller.

It has been found that the drawing speed at which a fibre can be coated in a reproducible manner over large lengths absolutely without bubbles can be further increased; for this purpose, a further preferred embodiment of the method according to the invention is characterized in that above the inlet opening a gas atmosphere is produced and maintained which consists of a gas having a kinematic viscosity lower than that of air; air has a kinematic viscosity of $14,8.10^{-6}$ m$^2$/s at a temperature of 20° C. As is known, the kinematic viscosity is $\nu = \eta/\rho$, in which $\eta$ = dynamic viscosity in Pa.s and $\rho$ = density in kg/m$^3$.

When the area in which fibre and coating material meet is surrounded by a gas having a comparatively low kinematic viscosity, lower than that of air with $\nu = 14,8.10^{-6}$ m$^2$/s, the risk of bubble formation is further reduced in that such a gas is less readily taken along by the fibre.

Experiments have shown that with the use of xenon as a gas having a kinematic viscosity of $3,8.10^{-6}$ m$^2$/s, which is consequently about a factor 4 lower than that of air, a fibre can be provided with a bubble-free coating also at drawing speeds of 3 m/s in a reproducible manner over larger lengths, i.e. over lengths of kilometers. The required quantities of gas are small, i.e. of the order of $\pm 15$ cm$^3$/s.

It has surprisingly been found that the drawing speed at which a fibre can still be coated absolutely without bubbles, can be still further increased, about a factor 4, up to values not considered possible hitherto. For this purpose, in another preferred embodiment of the method according to the invention, dichlorodifluoromethane is used as gas. With the use of this gas, a bubble-free coating was applied to the fibre even at drawing speeds of 12 m/s. The said gas has a kinematic viscosity of $2,3.10^{-6}$ m$^2$/s, which is consequently a factor 6.4 lower than that of air. Dichlorodifluoromethane is largely available and is comparatively inexpensive, at any rate much less expensive than xenon. Perhaps the drawing speed may be even further increased. In the experiments, the maximum drawing speed was limited to 12 m/s because the drawing equipment available for these experiments did not admit a higher speed.

A fibre provided with a coating applied by means of the method according to the invention is absolutely bubble-free, that is to say that the coating does not contain microscopically observable bubbles, at any rate does not contain bubbles larger than 1 to 2 $\mu$m.

As has already been explained, a bubble-free coating is especially of importance for optical glass fibres and for copper winding wire. Of course the invention can be used with equal advantage for coating fibres of a different composition, for example, fibres of synthetic material, fibres of carbon, metal fibres in general, etc.

The invention further relates to an arrangement for carrying out the method comprising a housing with a pressure chamber, a nozzle with an outlet opening which is in communication with the pressure chamber, a closure part provided with an inlet duct with a restricted inlet opening, said closure part closing the pressure chamber on the upper side, a supply opening in the wall of the housing for the supply of liquid coating material and an overflow opening in the sidewall of the housing; according to the invention, this arrangement is characterized in that the overflow opening in the sidewall of the housing is provided at a height lower than the level of the restricted inlet opening. Due to this measure, it is achieved that the restricted inlet opening of the fibre can never be flooded by the coating material and that the coating material can always form a convex meniscus in the inlet duct or in its inlet opening, as a result of which it is avoided that air bubbles are taken along by the fibre. The arrangement according to the invention forms a closed cup applicator with supply of the coating material under pressure.

The restricted inlet opening can be directly formed in the closure wall. However, if the inlet duct has a guide duct for the guidance of a fibre to be coated, the guide duct in a preferred embodiment of the arrangement according to the invention forms a connection between the restricted inlet opening and the pressure chamber, in other words, the restricted inlet opening is situated on the free end of the guide duct remote from the pressure chamber.

A further preferred embodiment of the arrangement according to the invention is characterized by a tubular member, which comprises the inlet duct with the restricted inlet opening and the guide duct and is exchangeably secured on the closure part. The arrangement can be adapted and modified in a simple manner for coating fibres of different diameters, by exchanging the nozzle and by replacing the tubular member by a member whose restricted inlet opening and/or whose guide duct have different dimensions.

In another preferred embodiment of the arrangement according to the invention, the tubular member is made of polytetrafluoroethylene. The said synthetic material is not wetted by most of the liquids, among which the coating material, as a result of which the formation of a convex meniscus of the coating material in the inlet duct and in its restricted inlet opening is facilitated.

As has already been explained, the drawing speed at which it is still possible to coat a fibre without bubbles being formed can be considerably increased by flushing the surroundings of the inlet opening with a gas having a kinematic viscosity lowar than that of air. For this purpose, a further preferred embodiment of the arrangement according to the invention is characterized in that the housing is closed by a cover with a central passage opening and is provided with a supply opening for the supply of a gas to the space of the housing located between the closure part and the cover. By these comparatively simple means, a gas can be guided towards and along the inlet opening.

In another preferred embodiment of the arrangement according to the invention, the housing has a circulation chamber which surrounds the part of the pressure chamber facing the outlet opening. By regulating the temperature of the water flowing through the circulation chamber, the temperature and the viscosity of the coating material present in the pressure chamber can be influenced directly and with little delay so that the thickness of the applied coating remains constant.

The invention will be explained with reference to an embodiment for coating an optical fibre. For this purpose, the known equipment 1 shown diagrammatically in FIG. 1 is used, which comprises a holder 3 for a pre-form P, a drawing furnace 5, a measurement device 7 for measuring the fibre diameter, a cooling device 9, a coating device 11 for applying a coating, a control device 13 for controlling the concentric location of fibre and coating, a curing device 15, a measurement device 17 for measuring the diameter of the coated fibre, a tension meter 19 for measuring the tensile force and a drawing device which in the embodiment shown is in the form of a take-up reel 21. A curing device operating with UV light is used for the frequently employed UV-curing coating material.

The drawing furnace 5, the measurement devices 7 and 17, the cooling device 9, the control device 13 and the curing device 15 may have a known construction and do not lie within the scope of the invention.

This equipment 1 is used in known manner as follows. By heating in the drawing furnace 5, a fibre F is drawn from a preform P, the drawing speed being regulated via the diameter measurement device 7 in a manner such that the diameter of the fibre F is as constant as possible. The fibre F is cooled in the colling device 9 to a temperature at which a coating of synthetic material can be applied. The fibre is coated in the coating device 11. After the coated fibre has been controlled in the control device 13 as to the correct concentric location of fibre and coating, the fibre F is passed through the curing device 15 for curing the coating. The diameter of the coated fibre is measured in the diameter measurement device 17, while the tensile force is measured in the tension meter 19. The finished fibre is wound onto the reel 21 which ensures that the fibre F is transported through the equipment 1.

FIGS. 2 and 3 show an embodiment according to the invention of the coating device 11. The device 11 is of the so-called force-feed coating applicator with supply of the coating material under pressure and comprises for this purpose a housing 31 with a circulation chamber 33 and provided with a bottom part 35 and a closure part 37. By means of a screw connection 39, a nozzle 40 is exchangeably provided in the bottom part 35 and this nozzle is provided with an outlet opening 41, which adjoins an outlet duct 43. Connections 45 and 47 serve for the circulation of warm water through the circulation chamber 33. The closure part 37 comprises a cylindrical wall portion 49 and a wall portion 51 extending the transverse direction, which portions enclose a space 50, said closure part being secured on the housing 31 by means of a screw connection 53. A tubular member 55 is exchangeably secured centrally in the wall portion 51 and this member has an inlet duct 56 with a restricted inlet opening 57 and a guide duct 59 and has a flattened endface 60. The transverse wall 51 closes a pressure chamber 61. A connection 63 serves for the supply under pressure of coating material C to the pressure chamber 61. An outlet opening 65 acts as an overflow and serves to drain any overflowing coating material. A further supply opening 67 for the supply of a gas is provided in the wall portion 49. A cover 69 with a closure wall 71 provided with a central passage opening 73 and with connections 75 serves for the forced draining of gas by means of a suction system not shown further. All parts except the tubular member 55 and the closure wall 71 are made of stainless steel. The parts which get into contact with the coating material are polished and are constructed without sharp edges of dead angles. The tubular member 55 is elastically deformable and is preferably made of polytetrafluoroethylene. At the level of the inlet opening 57, an adjustment block 77 is secured on the tubular member 55. There are mounted in the cylindrical wall 49 two adjustment screws 79 which are arranged at right angles to each other and are provided with disks or wheels 81 cooperating with rectilinear guide grooves 83 in the adjustment block 77. The closure wall 71 is made of glass in order to permit observation of the surroundings of the inlet opening 57 with the naked eye.

FIG. 4 shows diagrammatically besides the coating device 11 the necessary means for supplying the coating material and the gas and for the circulation of the water in the circulation chamber 33. Reference numeral 85 denotes a supply vessel, in which a given quantity of coating material is stored under pressure and at a given temperature. A pressure regulation device is designated by reference numeral 87. The coating material is heated to a given temperature by means of warm water, the supply of which is regulated by means of a water thermostat 89. During heating of the coating material, degasing also takes place so that the air bubles disappear therefrom. Reference numeral 91 denotes a further water thermostat which regulates the supply of warm water to the circulation chamber 33. Gas of low kinematic viscosity is present under pressure in a gas container 93. The flow rate of the gas is measured and adjusted by means of the flow meter 95. The further elements shown diagrammatically have already been described above.

For starting the arrangement described for coating an optical fibre F of 125 $\mu$m diameter, first there is drawn from the preform P at a comparatively low draw speed a fibre having a diameter which decreases gradually untill the fibre diameter is about 125 $\mu$m. The fibre F is then broken and is non threaded through the coating device 11 and the curing device 15 and is fixed on the reel 21. Subsequently, the drawing process is continued; the curing device 15 is made operative and coating matwrial C i.e. a UV-curing acrylate, is pressed through the connection 63 to the pressure chamber 61 from the supply vessel 85, in which it is held at a temperature of 65° to 70° C. A temperature of 45° to 50° C. is maintained in the circulation chamber 44 by means of the heating circuit ana at this temperature the coating material has a dynamic viscosity of 1.3 Pa.s. From the pressure chamber 61, the coating material C is pressed in part through the outlet duct 43 to the outlet opening 41 in the nozzle 40; along this trajectory, the coating material is taken up by the fibre F. Another part of the coating material is pressed from the pressure chamber 61 through the guide duct 59 and rises up to the inlet opening 57. In the beginning, when coating material is supplied to the coating device 11, many air bubbles are formed in the coating material. During the gradual increase of the drawing speed to the ultimately desired value, an excess of coating material is supplied, which is drained via the guide duct 59, the inlet opening 57, the space 50 and finally the overflow 65. As a result, the coating device 11 is flushed and the bubbles formed in the beginning stage are remove from the system. With increasing drawing speed, the pressure on the coating material is increased. When the desired drawing speed is attained, the pressure on the coating material in the supply vessel 85 is adjusted to such a value that the situation stabilises and that the coating material forms in the inlet duct 56, in the illustrated situation in the inlet opening 57 a convex meniscus D. The formation of this surface is facilitated in that the tubular member is made of polytetrafluoroethylene which is not wetted by the coating material. During the further process, this situation remains stable and stationary. No circulation of coating material and no bubble formation take place in the restricted inlet opening 57 and in the adjoining part of the guide duct 59. It has been found that due to these measures at a drawing speed up to about 2,5 m/s a coating can be applied to the fibre without occlusion of bubbles. At higher drawing speeds of about 3 m/s, bubbles are enclosed in the coating, it is true, but in a much lower concentration as compared with the coating methods known hitherto.

Figure 7:
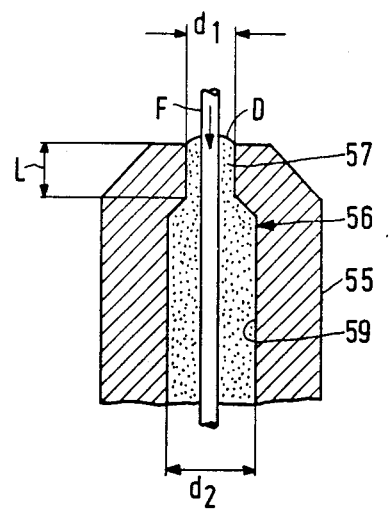
FIG. 7 is an enlarged view of part of the arrangement shown in FIG. 2.

FIG. 7 shows a part of the tubular element 55 comprising the inlet duct 56 with the restricted inlet opening 57 and the guide duct 59. The inlet opening 57 has a diameter d1 and a length L. The guide duct 59 has a diameter d2. In this Figure the convex meniscus D in the restricted inlet opening 57 is clearly illustrated. Experiments have shown that a restricted inlet opening having a diameter d1 of 0.9 to 1.1 mm and a length L of 2 mm is suitable for drawing speeds up to 3 m/s. The guide duct 59 had a length of 30 mm and a diameter d2 of 2 mm. A pressure of 300 kPa was maintained in the supply vessel. For coating a fibre having an original diameter of 125 $\mu$m to a diameter of 250 $\mu$m including the coating, use was made of a nozzle 40, whose outlet opening 41 had a diameter of 350 $\mu$m and a length of 3 mm.

Figure 5:
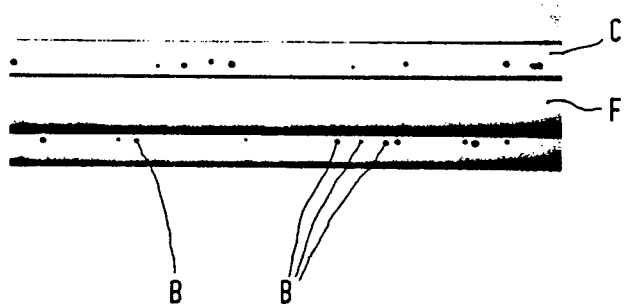
FIGS. 5 and 6 show a photographic enlargement on a scale of 80:1 of optical fibers coated according to the method of the invention.

FIG. 5 shows a photographic enlargement (80 times) recorded by means of the transmitted-light method of a fibre F having a diameter of 125 $\mu$m provided with a coating C having a thickness of 60 $\mu$m applied by means of the method according to the invention at a drawing speed of 3 m/s; the concentration of bubbles is very low; the observable bubbles are smaller than 8 to 10 $\mu$m. Fibres coated at a drawing speed of 2,5 m/s were absolutely bubble-free.

The thickness of the coating is also influenced by the temperature of the coating material and hence by its dynamic viscosity. It has been found that the thickness of the coating can be controlled in a simple and effective manner by an accurate and quickly responding regulation of the temperature and hence of the viscosity of the coating material by means of circulation of warm water in the circulation chamber 33.

Figure 8:
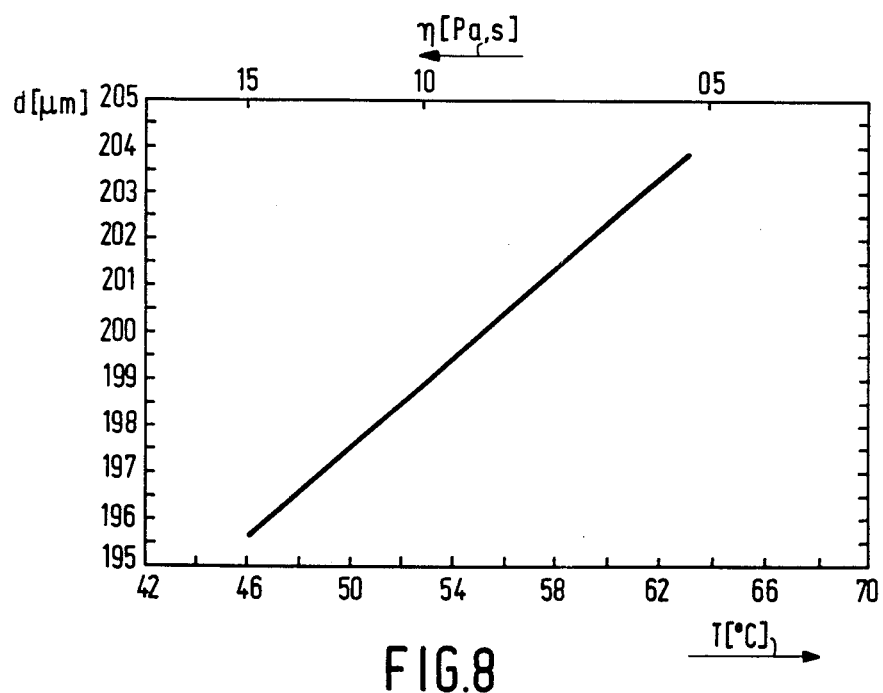
FIG. 8 is a graph showing the relation of the diameter of the coated fiber to the viscosity of the coating material.

The diagram of FIG. 8 shows the diameter d of a coated fibre as a function of the temperature T and the dynamic viscosity $\eta$ of the coating material. The diameter of the uncoated fibre was 125 $\mu$m. The diameter of the outlet opening 41 in the nozzle 40 was 260 $\mu$m. The coating material used was a commercially available UV-curable acrylate. The diameter d of the coated fibre increases with increasing temperature T and with decreasing viscosity of the coating material, the diameter of the outlet opening 41 remaining the same.

An absolutely bubble-free coating can also be applied to fibres at drawing speeds of 3 m/s and higher by a further measure according to the invention, that is to say by maintaining in the environment of the inlet opening 57 and above the convex meniscus D a gas atmosphere of a gas having a kinematic viscosity lower than that of air. This gas is supplied via the gas supply 67, flows into the space 50, flushes the inlet opening 57 and the meniscus D of the coating material and leaves the space 50 via the central passage 73 in the cover 69. Through the gas drains 75, this gas can be drained.

In the following Table some suitable gases are indicated.

| gas | $v$ | R |
|---|---|---|
| air | 14.8 | 1 |
| Ar | 12.3 | 0.83 |
| Xe | 3.8 | 0.26 |
| *CCl$_2$F$_2$ | 2.3 | 0.25 |

(*CCl$_2$F$_2$ = dichlorodifluoromethane)
$v$ = the kinematic viscosity in $10^{-6}$ m$^2$/s at 20° C.;
R = the ratio $\frac{v_{gas}}{v_{air}}$.

If during the coating of a fibre as described above with reference to FIG. 5, xenon is used as a flushing gas, a coating absolutely free of bubbles will be obtained at the same drawing speed of 3 m/s, the other parameters also remaining the same.

The drawing speed at which a fibre can be coated without bubbles being formed can be further increased by a factor 4 by using a gas whose kinematic viscosity is only 15% of that of air, i.e. dichlorodifluoromethane.

Figure 6:
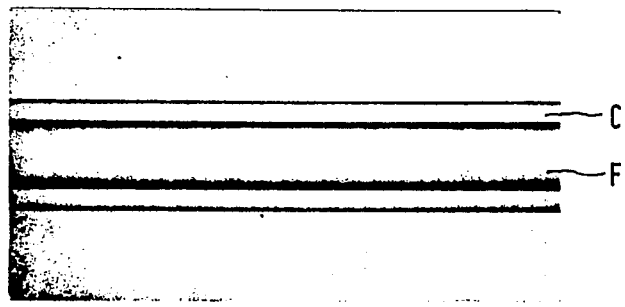

FIG. 6 shows the same enlargement of 80 times as FIG. 5 of a fibre provided with a coating having a coating with a thickness of 50 μm, at a drawing speed of 12 m/s and with the use of CCl$_2$F$_2$ as flushing gas. Even with the enlargement shown, not a single bubble can be observed. The gas was supplied at a rate of 13 cm$^3$/s. A pressure of 600 kPa was maintained in the supply vessel 85. The dimensions of the inlet opening 57 and of the guide duct 59 were the same as in the first embodiment. The result obtained has proved to be reproducible over large lengths, i.e. over lengths of kilometers. The drawing speed attained of 12 m/s was the highest drawing speed admitted by the drawing equipment available for the experiments. In view of the particular results and the extraordinary effects, it is probable that even higher speeds are possible.

All parts of the drawing equipment 1 are arranged accurately in line along a common centre line H—H, with which the centre line of the fibre F coincides, in order to obtain a radial-symmetrical influencing of the fibre, i.e. heating, cooling and curing. The coating should also be arranged coaxially or concentrically with respect to the fibre, in other words, the thickness of the coating should be constant, viewed along the circumference of the fibre. A fibre with a non-concentric coating is subjected to non-concentric asymmetrical forces during cooling or heating. These asymmetrical forces are due to unequal expansion coefficients of fibre material and coating material and may result in undesired variations of the optical properties of the fibre.

The concentric location of fibre and coating is continuously measured by means of the control device 13. An error in the concentricity can be readjusted or eliminated in a simple manner in the arrangement illustrated by simply adjusting the elastically deformable tubular member 55, which is made of polytetrafluroethylene, by means of the adjustment screws 79. As a result, the restricted inlet opening 57 can be centred or adjusted in such a manner that the coating is again located concentrically around the fibre. Further adjustments or re-adjustments are not required. The position of the nozzle 40 with the outlet opening remains unchanged, i.e. in line with and coaxial to the centre line H—H of the equipment.

What is claimed is:

1. An arrangement for a method of coating a fibre, in which a fiber to be coated is passed through an inlet duct with a restricted inlet opening, is guided through a pressure chamber filled with liquid coating material, and after being coated is drawn through the outlet opening of a nozzle, the coating material being supplied under pressure to the pressure chamber, the coating material being supplied at such a pressure and in such a quantity that the material rises in the inlet duct up to a certain level to form a convex meniscus, said arrangement comprising a housing provided with a sidewall portion, a bottom wall portion, a pressure chamber, a nozzle with an outlet opening for said fiber in communication with the pressure chamber, a closure part transverse to, and cooperating with the sidewall portion of said housing, for closing the upper side of said pressure chamber and provided with an inlet duct with a restricted inlet opening, and communicating with said pressure chamber for supplying fiber to said pressure chamber, a cover part, provided with a central opening for said fiber and cooperating with the sidewall portion above the closure part, thereby closing the housing and providing a space in the housing above the closure part, a first supply opening situated in the housing above the closure part for supplying gas to the space above the closure part, a second supply opening situated in the sidewall portion of the housing for supplying liquid coating material to the pressure chamber and an overflow opening situated in the sidewall portion of the housing, the overflow opening in the sidewall portion of the housing being provided at a height lower than the level of the restricted inlet opening.

2. An arrangement as claimed in claim 1, in which the inlet duct has a guide duct for the guidance of a fibre to be coated, characterized in that the guide duct forms a connection between the restricted inlet opening and the pressure chamber.

3. An arrangement as claimed in claim 2, characterized in that a tubular member comprises the inlet duct with the restricted inlet opening and the guide duct and is exchangeably secured on the closure part.

4. An arrangement as claimed in claim 1, characterized in that the housing has a circulation chamber which surrounds the part of the chamber facing the outlet opening.

5. An arrangement for a method of coating a fiber, in which a fiber to be coated is passed through an inlet duct with a restricted inlet opening, is guided through a pressure chamber filled with liquid coating material, and after being coated is drawn through the outlet opening of a nozzle, the coating material being supplied under such pressure to the pressure chamber, at such a pressure and in such a quantity that the material rises in the inlet duct up to a certain level to form a convex meniscus, said arrangement comprising a housing provided with a sidewall portion, a bottom wall portion, a pressure chamber, a closure part transverse to, and cooperating with the sidewall portion of the housing for closing the upper side of the pressure chamber, said closure part being provided with an inlet duct with a restricted inlet opening for supplying fiber to said chamber, said inlet duct forming a connection between the restricted inlet opening and the pressure chamber and being a guide duct formed of a tubular member made of polytetrafluorethylene, a nozzle with an outlet opening for the fiber in communication with the pressure chamber, a cover part provided with a central opening for the fiber and cooperating with the sidewall portion above the closure part, thereby closing the housing and providing a space in the housing above the closure part, a first supply opening situated in the housing above the closure part for supplying gas to the space above the closure part, a second supply opening situated in the sidewall portion of the housing for supplying liquid coating material to the pressure chamber and an overflow opening for said liquid coating material situated in the sidewall portion of the housing at a height lower than the level of the restricted inlet opening wall portion.

* * * * *